US011589346B2

(12) United States Patent
Abedini et al.

(10) Patent No.: US 11,589,346 B2
(45) Date of Patent: Feb. 21, 2023

(54) MANAGEMENT OF RESOURCES IN INTEGRATED ACCESS AND BACKHAUL

(71) Applicant: QUALCOMM Incorporated, San Diego, CA (US)

(72) Inventors: Navid Abedini, Somerset, NJ (US); Jianghong Luo, Skillman, NJ (US); Luca Blessent, Whitehouse Station, NJ (US); Karl Georg Hampel, Hoboken, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 16/949,558

(22) Filed: Nov. 3, 2020

(65) Prior Publication Data

US 2021/0176746 A1    Jun. 10, 2021

Related U.S. Application Data

(60) Provisional application No. 62/945,537, filed on Dec. 9, 2019.

(51) Int. Cl.
*H04W 72/04* (2009.01)
*H04L 5/00* (2006.01)
(Continued)

(52) U.S. Cl.
CPC ....... *H04W 72/0426* (2013.01); *H04L 5/0053* (2013.01); *H04W 28/18* (2013.01); *H04W 76/27* (2018.02)

(58) Field of Classification Search
CPC . H04W 72/0426; H04W 28/18; H04W 16/10; H04L 5/0053; H04L 5/003; H04B 7/15542
See application file for complete search history.

(56) References Cited

U.S. PATENT DOCUMENTS 11,140,695 B1\*  10/2021  Eyuboglu ......... H04W 72/1257
2020/0030574 A1\*   1/2020  Basiony ............. A61M 25/007
(Continued)

FOREIGN PATENT DOCUMENTS

CN        114145058    *  7/2019   ............. H04L 5/003
CN   WO 2021087999    * 11/2019   ............. H04W 72/00
(Continued)

OTHER PUBLICATIONS

International Search Report and Written Opinion—PCT/US2020/070749—ISA/EPO—dated Feb. 17, 2021.
(Continued)

*Primary Examiner* — Diane L Lo
*Assistant Examiner* — Abusayeed M Haque
(74) *Attorney, Agent, or Firm* — Harrity & Harrity, LLP

(57) ABSTRACT

Various aspects of the present disclosure generally relate to wireless communication. In some aspects, a parent node may determine that a set of resources is not available for the parent node for communication with a child node of the parent node. The parent node may provide an availability indicator to the child node based at least in part on determining that the set of resources is not available for the parent node for communication with the child node. The availability indicator may indicate the set of resources as available for the child node. Numerous other aspects are provided.

30 Claims, 11 Drawing Sheets

(51) Int. Cl.
*H04W 28/18* (2009.01)
*H04W 76/27* (2018.01)

(56) References Cited

U.S. PATENT DOCUMENTS

| | | | | |
|---|---|---|---|---|
| 2020/0145860 | A1* | 5/2020 | Koskela | H04W 76/14 |
| 2020/0145952 | A1* | 5/2020 | Keskitalo | H04W 56/007 |
| 2020/0145965 | A1* | 5/2020 | Luo | H04W 72/042 |
| 2020/0146033 | A1* | 5/2020 | Islam | H04W 72/1268 |
| 2021/0144718 | A1* | 5/2021 | Jyothi | H04W 72/0493 |

FOREIGN PATENT DOCUMENTS

| | | | | |
|---|---|---|---|---|
| CN | WO-2021087999 | * | 11/2019 | H04W 72/00 |
| SE | WO 2021066690 | * | 10/2019 | H04L 5/00 |
| SE | WO-2021066690 | * | 10/2019 | H04L 5/00 |

OTHER PUBLICATIONS

LG Electronics: "Discussions on Resource Multiplexing Among Backhaul and Access Links", 3GPP Draft, 3GPP TSG RAN WG1 #96, R1-1902080 Discussions on Resource Multiplexing Among Backhaul and Access Links, 3rd Generation Partnership Project (3GPP), Mobile Competence Centre, 650, Route Des Lucioles, F-06921 SOP, vol. RAN WG1. No. Athens. Greece, Feb. 25, 2019-Mar. 1, 2019 Feb. 16, 2019 (Feb. 16, 2019). XP051599776, pp. 1-6, Retrieved from the Internet:URL:http://www.3gpp.org/ftp/tsg%5Fran/WG1%5FRL1/TSGR1%5F96/Docs/R1%2D1902080%2Ezip [retrieved on Feb. 16, 2019] paragraphs [0002]-[02.2], figure 1, table 1.

Qualcomm Incorporated: "IAB Resource Management", 3GPP Draft, 3GPP TSG RAN WG1 Meeting #94, R1-1809444, 3rd Generation Partnership.Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 17, 2018 (Aug. 17, 2018), XP051516809, 6 Pages, Retrieved from the Internet: URL: http://www.3gpp.org/ftp/tsg%5Fran/WG1%5FRL1/TSGR1%5F94/Docs/R1%2D1809444%2Ezip [retrieved on Aug. 17, 2018], pp. 2-5, 2.1 Baseline Approach: Semi-Static Resource Partitioning p. 5, 2.2 Enhanced Approach: Dynamic Resource Coordination Figures 2, 4, 5, Sections 2-3, paragraphs [0001]-[0002].

Qualcomm Incorporated: "IAB Resource Management Framework", 3GPP Draft, 3GPP TSG RAN WG1 Meeting AH1901, R1-1900881, IAB Resource Management Framework, 3rd Generation Partnership Project (3GPP), Mobile Competence Centre, 650, Route Des Lucioles, F-06921, Sophia-Antipolis Cedex, France, vol. RAN WG1. No. Taipei, Taiwan; Jan. 21, 2019-Jan. 25, 2019, Jan. 20, 2019 (Jan. 20, 2019), XP051593727, Jan. 12, 2019 (Jan. 12, 2019), 8 Pages, Retrieved from the Internet: URL: http://www.3gpp.org/ftp/Meetings%5F3GPP%5FSYNC/RAN1/Docs/R1%2D1900881%2Ezip [retrieved on Jan. 20, 2019], 1st bullet, p. 4, p. 1. line 13. paragraph 2—line 15, p. 2. line 1. paragraph 3.1—line 4,p. 3, figure 1,page 4, figure 2, p. 4. line 1. paragraph 3.2.1—p. 5,line 20, Proposal 1 and 2, p. 5, paragraphs [0002], [03.2], [retrieved on Jan. 12, 2019] figures 2-3, section 2, section 3.2, figure 2, section 3.3, the whole document.

* cited by examiner

MANAGEMENT OF RESOURCES IN INTEGRATED ACCESS AND BACKHAUL

CROSS-REFERENCE TO RELATED APPLICATION

This Patent Application claims priority to U.S. Provisional Patent Application No. 62/945,537, filed on Dec. 9, 2019, entitled "MANAGEMENT OF RESOURCES IN INTEGRATED ACCESS AND BACKHAUL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for management of resources in integrated access and backhaul (IAB).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a parent node, may include determining that a set of resources is not available for the parent node for communication with a child node of the parent node; and providing an availability indicator to the child node based at least in part on determining that the set of resources is not available for the parent node for communication with the child node, wherein the availability indicator indicates the set of resources as available for the child node.

In some aspects, a method of wireless communication, performed by a child node, may include receiving an availability indicator from a parent node of the child node, wherein the availability indicator indicates a set of resources as available for the child node; determining, based at least in part on the availability indicator, that the set of resources will not be used by the parent node for communication with the child node; and selectively modifying a scheduled communication with the parent node using the set of resources based at least in part on determining that the set of resources will not be used by the parent node for communication with the child node.

In some aspects, a method of wireless communication, performed by a central unit (CU), may include determining, based at least in part on a resource configuration associated with a parent node, that a set of resources is not available to the parent node for communication with a child node of the parent node; selecting an availability indicator configuration based at least in part on determining that the set of resources is not available to the parent node for communication with the child node, wherein the availability indicator configuration is selected to permit the parent node to indicate, to the child node, the set of resources as available for the child node; and providing the availability indicator configuration to at least one of the parent node and the child node.

In some aspects, a parent node for wireless communication may include memory and one or more processors operatively coupled to the memory. The memory and the one or more processors may be configured to determine that a set of resources is not available for the parent node for communication with a child node of the parent node; and provide an availability indicator to the child node based at least in part on determining that the set of resources is not available for the parent node for communication with the child node, wherein the availability indicator indicates the set of resources as available for the child node.

In some aspects, a child node for wireless communication may include memory and one or more processors operatively coupled to the memory. The memory and the one or more processors may be configured to receive an availability indicator from a parent node of the child node, wherein the availability indicator indicates a set of resources as available for the child node; determine, based at least in part on the availability indicator, that the set of resources will not be used by the parent node for communication with the child node; and selectively modify a scheduled communication with the parent node using the set of resources based at least in part on determining that the set of resources will not be used by the parent node for communication with the child node.

In some aspects, a central unit for wireless communication may include memory and one or more processors operatively coupled to the memory. The memory and the one or more processors may be configured to determine, based at least in part on a resource configuration associated with a parent node, that a set of resources is not available to the parent node for communication with a child node of the parent node; select an availability indicator configuration based at least in part on determining that the set of resources is not available to the parent node for communication with the child node, wherein the availability indicator configuration is selected to permit the parent node to indicate, to the child node, the set of resources as available for the child node; and provide the availability indicator configuration to at least one of the parent node and the child node.

In some aspects, a non-transitory computer-readable medium may store one or more instructions for wireless communication. The one or more instructions, when executed by one or more processors of a parent node, may cause the one or more processors to: determine that a set of resources is not available for the parent node for communication with a child node of the parent node; and provide an availability indicator to the child node based at least in part on determining that the set of resources is not available for the parent node for communication with the child node, wherein the availability indicator indicates the set of resources as available for the child node.

In some aspects, a non-transitory computer-readable medium may store one or more instructions for wireless communication. The one or more instructions, when executed by one or more processors of a child node, may cause the one or more processors to: receive an availability indicator from a parent node of the child node, wherein the availability indicator indicates a set of resources as available for the child node; determine, based at least in part on the availability indicator, that the set of resources will not be used by the parent node for communication with the child node; and selectively modify a scheduled communication with the parent node using the set of resources based at least in part on determining that the set of resources will not be used by the parent node for communication with the child node.

In some aspects, a non-transitory computer-readable medium may store one or more instructions for wireless communication. The one or more instructions, when executed by one or more processors of a central unit, may cause the one or more processors to: determine, based at least in part on a resource configuration associated with a parent node, that a set of resources is not available to the parent node for communication with a child node of the parent node; select an availability indicator configuration based at least in part on determining that the set of resources is not available to the parent node for communication with the child node, wherein the availability indicator configuration is selected to permit the parent node to indicate, to the child node, the set of resources as available for the child node; and provide the availability indicator configuration to at least one of the parent node and the child node.

In some aspects, an apparatus for wireless communication may include means for determining that a set of resources is not available for a parent node for communication with a child node of the parent node; and means for providing an availability indicator to the child node based at least in part on determining that the set of resources is not available for the parent node for communication with the child node, wherein the availability indicator indicates the set of resources as available for the child node.

In some aspects, an apparatus for wireless communication may include means for receiving an availability indicator from a parent node of a child node, wherein the availability indicator indicates a set of resources as available for the child node; means for determining, based at least in part on the availability indicator, that the set of resources will not be used by the parent node for communication with the child node; and means for selectively modifying a scheduled communication with the parent node using the set of resources based at least in part on determining that the set of resources will not be used by the parent node for communication with the child node.

In some aspects, an apparatus for wireless communication may include means for determining, based at least in part on a resource configuration associated with a parent node, that a set of resources is not available to the parent node for communication with a child node of the parent node; means for selecting an availability indicator configuration based at least in part on determining that the set of resources is not available to the parent node for communication with the child node, wherein the availability indicator configuration is selected to permit the parent node to indicate, to the child node, the set of resources as available for the child node; and means for providing the availability indicator configuration to at least one of the parent node and the child node.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
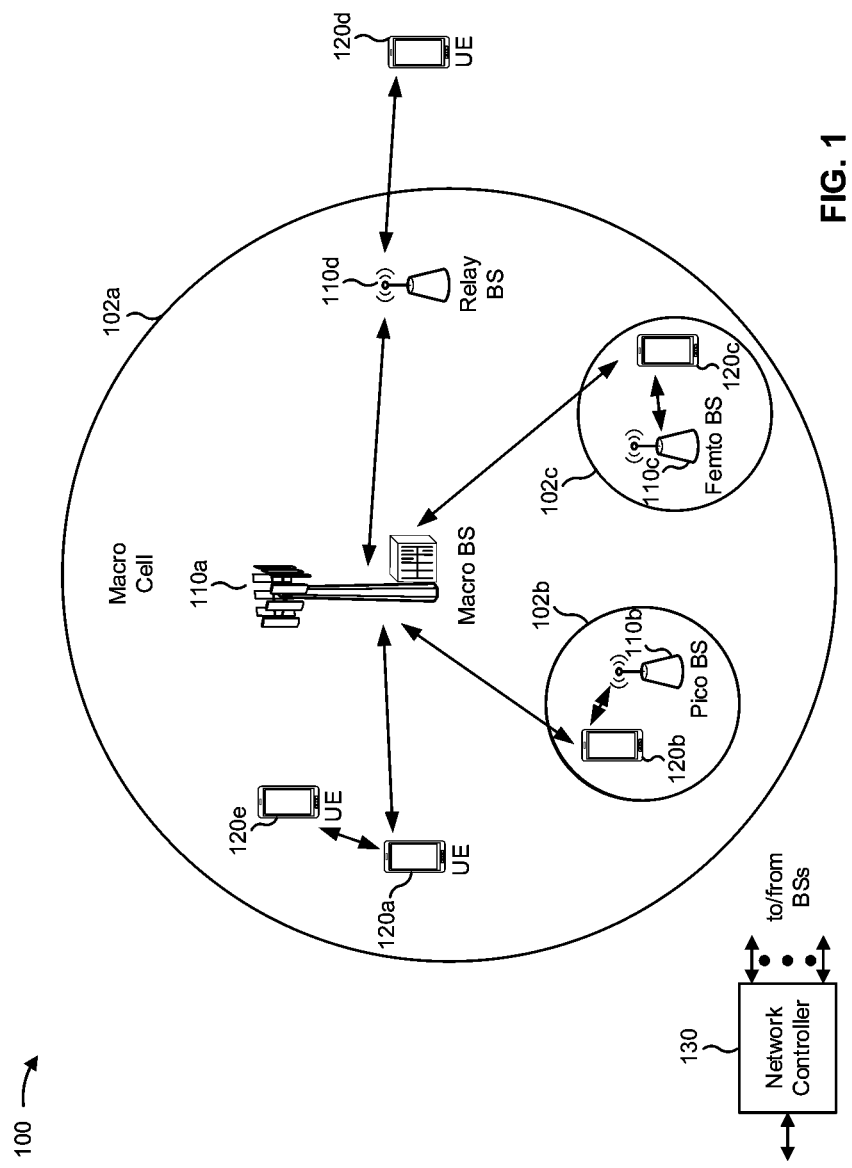
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband interne of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, a wireless communication device in wireless network 100 (e.g., base station 110, UE 120, a network controller 130, and/or the like) may be configured as a parent node in an IAB network and/or as a child node in the IAB network, an example architecture of which is described below with respect to FIG. 4. In some aspects, such a wireless communication device, when configured as a parent node, may determine that a set of resources is not available for communication with a child node of the parent node, and provide an availability indicator to the child node, where the availability indicator indicates the set of resources as available for the child node. In some aspects, such a wireless communication device, when configured as a child node, may receive an availability indicator indicating a set of resources as available for the child node, may determine that the set of resources will not be used by a parent node of the child node for communication with the child node, and may selectively modify a scheduled communication with the parent node using the set of resources based at least in part on this determination. In some aspects, such a configuration in wireless network 100 may be used in a scenario in which a set of resources unavailable to a parent node at least partially overlaps a set of soft resources allocated to a child node (e.g., when an explicit indication of availability of the set of resources is needed) or when cancellation of an action by a child node would be beneficial (e.g., in order to reduce interference, conserve power, improve resource utilization, and/or the like), as described in further detail below.

As indicated above, FIG. 1 is provided as an example. Other examples may differ from what is described with regard to FIG. 1.

Figure 2:
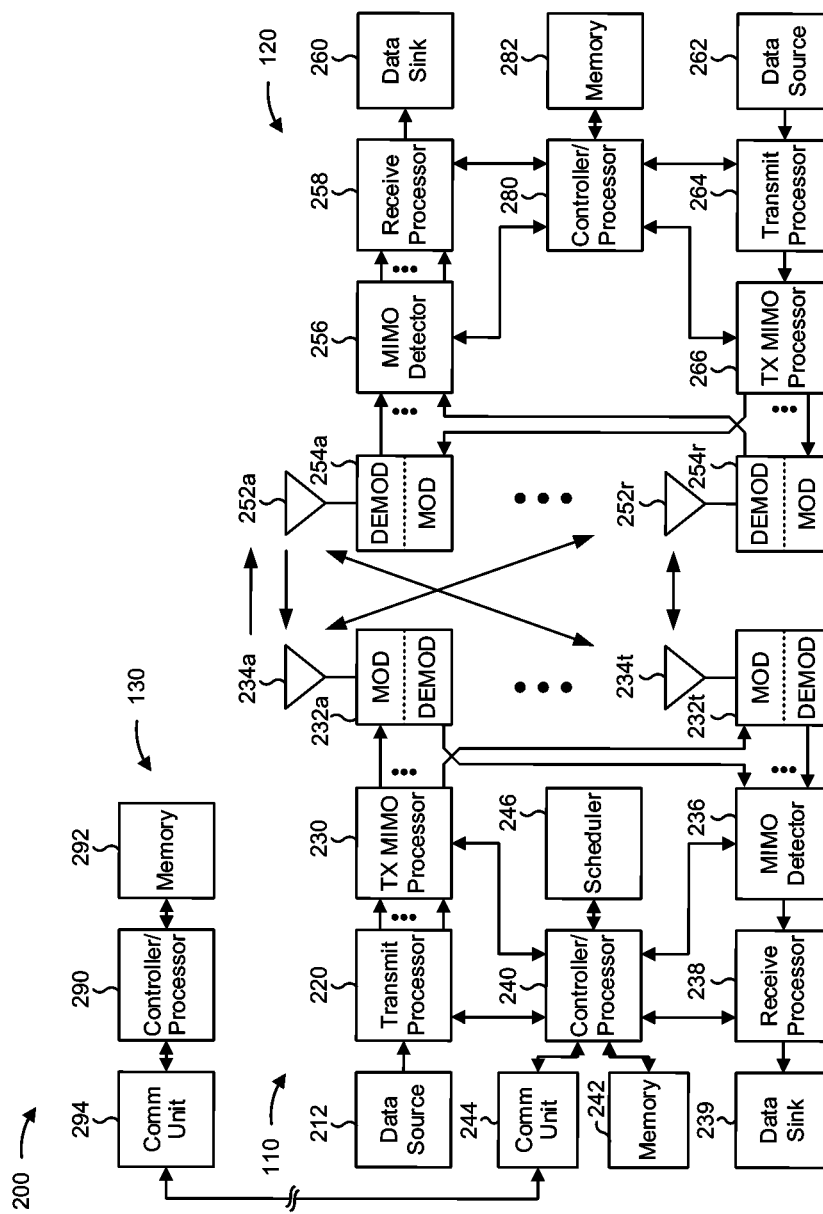
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with management of resources in IAB, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, process 800 of FIG. 8, and/or other processes as described herein. A scheduler 246 may schedule UEs for data transmission on the downlink and/or uplink.

In some aspects, a wireless communication device configured as a parent node in an IAB network (e.g., UE 120, base station 110) may include means for determining that a set of resources is not available for the parent node for communication with a child node of the parent node; means for providing an availability indicator to the child node based at least in part on determining that the set of resources is not available for the parent node for communication with the child node, wherein the availability indicator indicates the set of resources as available for the child node; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a wireless communication device configured as a child node in an IAB network (e.g., UE 120, base station 110) may include means for receiving an availability indicator from a parent node of the child node, wherein the availability indicator indicates a set of resources as available for the child node; means for determining, based at least in part on the availability indicator, that the set of resources will not be used by the parent node for communication with the child node; means for selectively modifying a scheduled communication with the parent node using the set of resources based at least in part on determining that the set of resources will not be used by the parent node for communication with the child node; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a wireless communication device configured as a central unit (CU) in an IAB network (e.g., UE 120, base station 110) may include means for determining, based at least in part on a resource configuration associated with a parent node, that a set of resources is not available to the parent node for communication with a child node of the parent node; selecting an availability indicator configuration based at least in part on determining that the set of resources is not available to the parent node for communication with the child node, wherein the availability indicator configuration is selected to permit the parent node to indicate, to the child node, the set of resources as available for the child node; means for providing the availability indicator configuration to at least one of the parent node and the child node; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
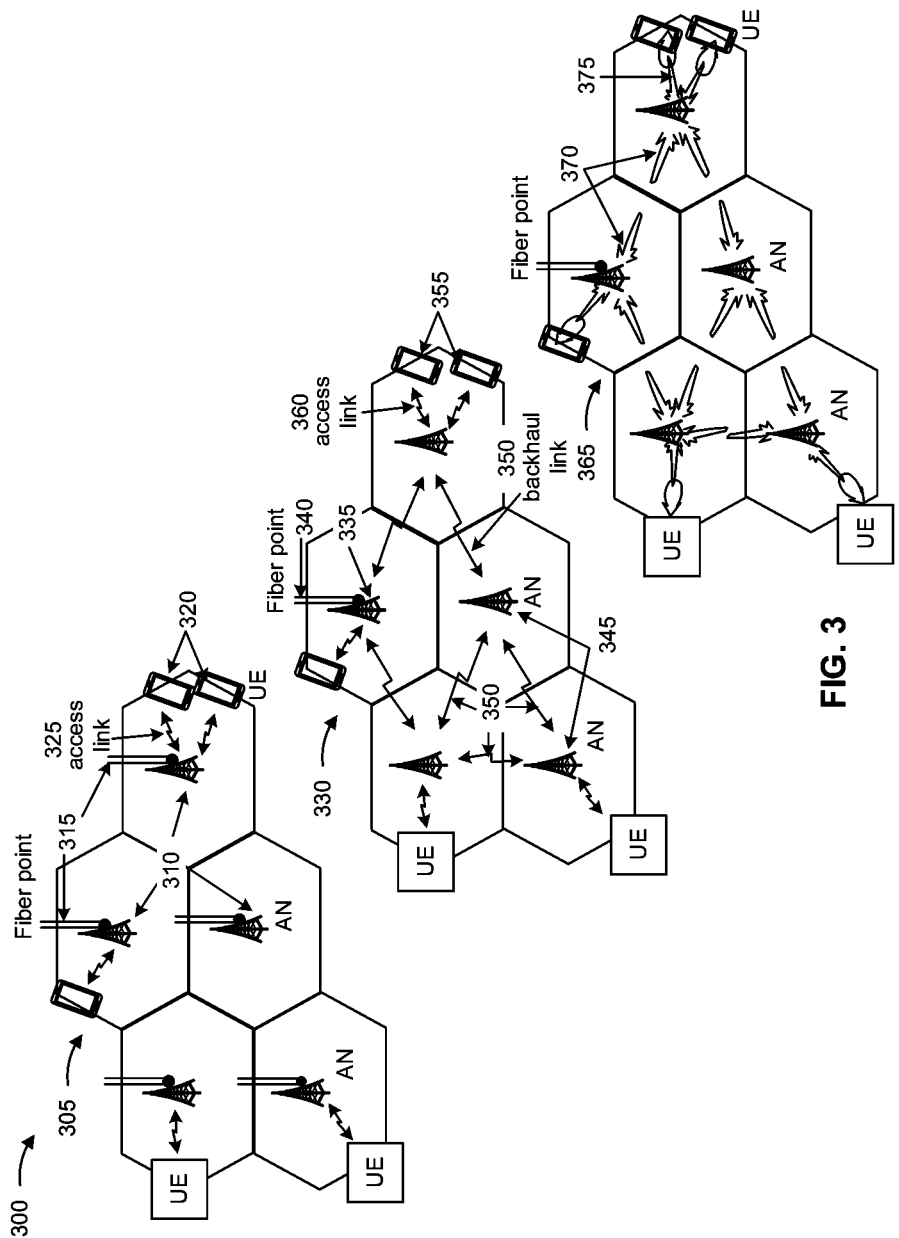
FIG. 3 is a diagram illustrating examples of radio access networks, in accordance with various aspects of the present disclosure.

FIG. 3 is a diagram illustrating examples of radio access networks, in accordance with various aspects of the disclosure.

As shown by reference number 305, a traditional (for example, 3G, 4G, LTE) radio access network may include multiple base stations 310 (for example, access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor. The IAB network may include one or more non-anchor base stations 345, sometimes referred to as relay base stations or IAB nodes. The non-anchor base station 345 may communicate directly with or indirectly with (for example, via one or more other non-anchor base stations 345) the anchor base station 335 via one or more backhaul links 350 to form a backhaul path to the core network for carrying backhaul traffic. Backhaul link 350 may be a wireless link. Anchor base station(s) 335 or non-anchor base station(s) 345 may communicate with one or more UEs 355 via access links 360, which may be wireless links for carrying access traffic. In some aspects, an anchor base station 335 or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology or directional communications (for example, beamforming, precoding) for communications between base stations or UEs (for example, between two base stations, between two UEs, or between a base station and a UE). For example, wireless backhaul links 370 between base stations may use millimeter waves to carry information or may be directed toward a target base station using beamforming, precoding. Similarly, the wireless access links 375 between a UE and a base station may use millimeter waves or may be directed toward a target wireless node (for example, a UE or a base station). In this way, inter-link interference may be reduced.

In some aspects, an IAB network may support a multi-hop network or a multi-hop wireless backhaul. Additionally, or alternatively, each node of an IAB network may use the same radio access technology (for example, 5G/NR). Additionally, or alternatively, nodes of an IAB network may share resources for access links and backhaul links, such as time resources, frequency resources, spatial resources. Furthermore, various architectures of IAB nodes or IAB donors may be supported.

In some aspects, an IAB donor may include a central unit (CU) that configures IAB nodes that access a core network via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with base station 110 for that IAB node, and an MT of an IAB node may perform functions described in connection with UE 120 for that IAB node.

As indicated above, FIG. 3 is provided as an example. Other examples may differ from what is described with regard to FIG. 3.

Figure 4:
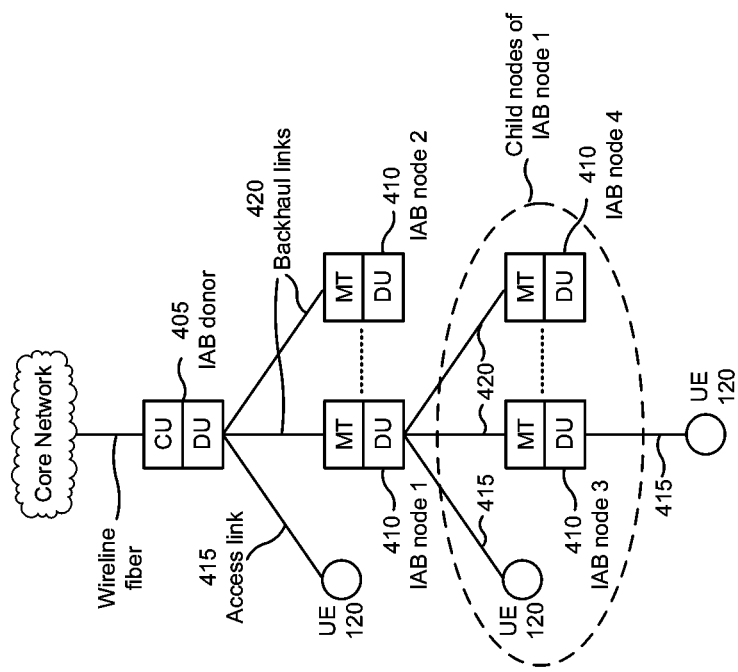
FIG. 4 is a diagram illustrating an example of an integrated access and backhaul (IAB) network architecture in accordance with various aspects of the disclosure.

FIG. 4 is a diagram illustrating an example of an IAB network architecture, in accordance with various aspects of the disclosure. As shown in FIG. 4, an IAB network may include an IAB donor 405 that connects to a core network via a wired connection (for example, as a wireline fiber). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a CU, which may perform ANC functions or AMF functions. The CU may configure a DU of the IAB donor 405 or may configure one or more IAB nodes 410 (for example, an MT or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (for example, a radio resource control (RRC) configuration message, an F1 application protocol (F1AP) message).

As described above, the IAB network may include IAB nodes 410 (shown as IAB nodes 1 through 4) that connect to the core network via the IAB donor 405. As shown, an IAB node 410 may include an MT and may include a DU. The MT of an IAB node 410 (for example, a child node) may be controlled or scheduled by another IAB node 410 (for example, a parent node) or by an IAB donor 405. The DU of an IAB node 410 (for example, a parent node) may control or schedule other IAB nodes 410 (for example, child nodes of the parent node) or UEs 120. Thus, a DU may be referred to as a scheduling node or a scheduling component, and an MT may be referred to as a scheduled node or a scheduled component. In some aspects, an IAB donor 405 may include a DU and not an MT. That is, an IAB donor 405 may configure, control, or schedule communications of IAB nodes 410 or UEs 120. A UE 120 may include only an MT, and not a DU. That is, communications of a UE 120 may be controlled or scheduled by an IAB donor 405 or an IAB node 410 (for example, a parent node of the UE 120).

When a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor 405 or an IAB node 410, and a child node may be an IAB node 410 or a UE 120. Communications of an MT of a child node may be controlled or scheduled by a parent node of the child node.

As further shown in FIG. 4, a link between a UE 120 and an IAB donor 405, or between a UE 120 and an IAB node 410, may be referred to as an access link 415. Each access link 415 may be a wireless access link that provides a UE 120 with radio access to a core network via the IAB donor 405, and potentially via one or more IAB nodes 410.

As further shown in FIG. 4, a link between an IAB donor 405 and an IAB node 410, or between two IAB nodes 410, may be referred to as a backhaul link 420. Each backhaul link 420 may be a wireless backhaul link that provides an IAB node 410 with radio access to a core network via the IAB donor 405, and potentially via one or more other intermediate IAB nodes 410. In some aspects, a backhaul link 420 may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links 415 and backhaul links 420.

As indicated above, FIG. 4 is provided as an example. Other examples may differ from what is described with regard to FIG. 4.

In an IAB network, a CU (e.g., configured on IAB donor 405) may handle allocation of resources to other nodes in the IAB network, such as DUs of IAB nodes 410, MTs of IAB nodes 410, UEs 120, and/or the like. In some cases, the CU may allocate resources such that a given set of resources is not available for a parent node (e.g., a first IAB node 410), meaning that the parent node is not permitted to communicate with its child nodes (e.g., a second IAB node 410, a UE 120) over the set of resources. However, a child node does not have access to information associated with resource allocation to its parent node, meaning that the child node would not have any information indicating whether a given set of resources is available or unavailable to the parent node for communication with the child node.

One problem arising from this lack of information at the child node occurs when a set of resources that is unavailable to a parent node is allocated as a set of soft resources for a child of the parent node. With reference to a resource (e.g., a slot) of an IAB node DU cell, a symbol in a slot of an IAB node DU cell can be configured to be of hard, soft, or unavailable type. When a downlink, uplink, or flexible symbol is configured as soft, the IAB node DU can respectively transmit, receive, or either transmit or receive in the symbol only if (1) transmission or reception by the IAB node DU in the soft symbol does not alter the ability to transmit or receive that the IAB node MT would have if the DU symbol were configured as unavailable, and (2) the IAB node DU detects a particular downlink control information (DCI) format (e.g., DCI format 2_5) with an availability indicator index field value indicating the soft symbol as available for transmission or reception.

In a case in which a set of resources that is unavailable to a parent node is allocated as a set of soft resources for a child node of the parent node, the child node needs to determine whether the set of soft resources is available to the child node (e.g., whether the child node can use the set of soft resources for communicating with its own child nodes). In this scenario, the child node should determine the availability of the set of soft resources to the child node irrespective of availability of these resources to the parent node (e.g., since the parent node does not own or control these resources). The child node may make such a determination based on an implicit indication (e.g., based on an implicit release of the resources), or based on an explicit indication provided by the parent (e.g., an explicit indication from the parent). When an explicit indication needs to be provided by the parent node (e.g., when availability of other resources controlled by the parent node are around the set of soft resources such that an implicit indication is insufficient or not possible), the parent node cannot skip signaling availability of the set of soft resources for the parent node and, therefore, must provide some availability indicator to the child node regarding the set of resources that is unavailable to the parent node that at least partially overlaps the set of soft resources allocated to the child node.

Another problem arising from the lack of information at the child node regarding availability of resources to its parent node occurs because a parent node knows that no communication between the parent node and its child node will occur in a set of resources unavailable to the parent node, but the child node does not have such information. Therefore, in some cases, the child node may perform some action in those resources, such as scanning for a transmission from the parent node that is intended for the child node, attempting to receive a scheduled (e.g., semi-statically scheduled) transmission from the parent node, transmitting a scheduled (e.g., semi-statically scheduled) transmission to the parent node (which the parent node will not attempt to receive), and/or the like. In such cases, such actions by the child node may result in interference, unnecessary power consumption, and/or inefficient overall resource utilization (e.g., since the child node could potentially use the set of resources to serve its own child nodes).

Some aspects described herein provide techniques and apparatuses for handling of resources in IAB. In some aspects, a parent node may determine that a set of resources is not available for the parent node for communication with a child node of the parent node. Here, the parent node may provide an availability indicator to the child node based at least in part this determination, and the availability indicator may indicate the set of resources as available for the child node. That is, a set of resources that is unavailable for the parent node for communication with the child node may be indicated to the child node as available for the child node. In some aspects, the child node may receive the availability indicator indicating the set of resources as available for the child node, may determine that the set of resources will not be used by the parent node for communication with the child node, and may selectively modify a scheduled communication with the parent node using the set of resources based at least in part on determining that the set of resources will not be used by the parent node for communication with the child node. Such an approach may be used in a scenario in which a set of resources unavailable to a parent node at least partially overlaps a set of soft resources allocated to a child node (e.g., when an explicit indication of availability of the set of resources is needed) or when cancellation of an action by a child node would be beneficial (e.g., in order to reduce interference, conserve power, improve resource utilization, and/or the like). Additional details are provided below.

Figure 5:
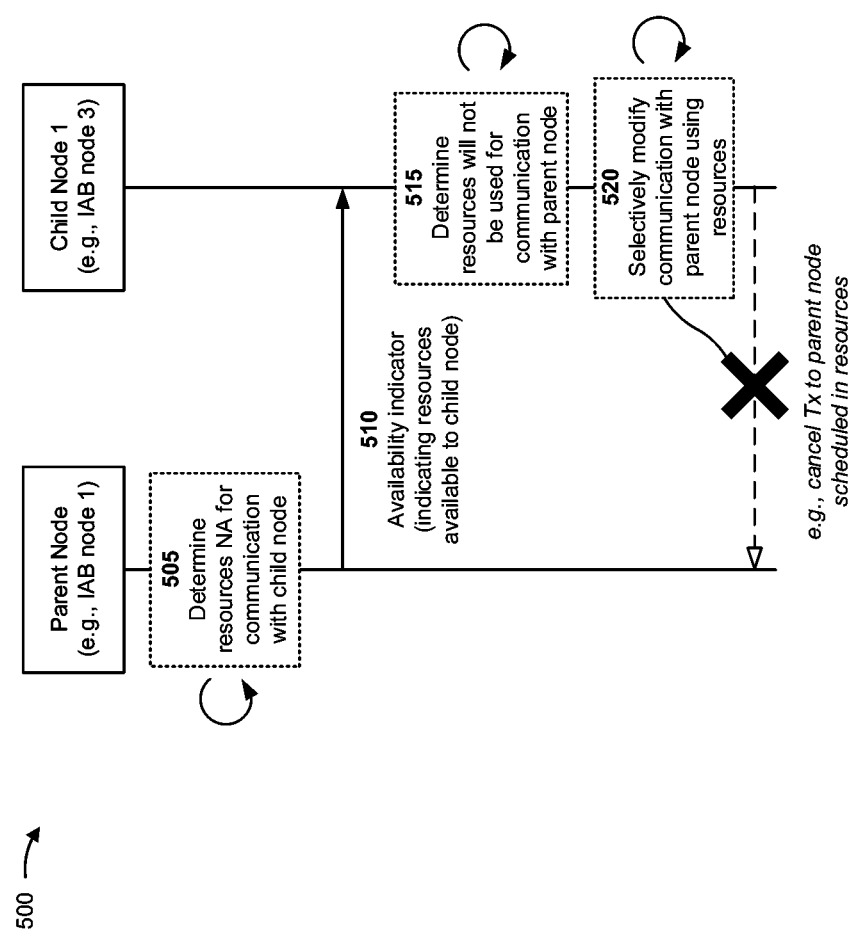
FIG. 5 is a diagram illustrating an example of management of resources in IAB, in accordance with various aspects of the present disclosure.

FIG. 5 is a diagram illustrating an example 500 associated with management of resources in IAB, in accordance with various aspects of the present disclosure.

As shown in FIG. 5 by reference 505, a parent node in an IAB network (e.g., a base station 110 configured as IAB node 1 in FIG. 4) may determine that a set of resources is not available for the parent node for communication with a child node of the parent node (e.g., a base station 110 configured as IAB node 3 in FIG. 4).

In some aspects, the parent node may determine that the set of resources is not available for communication with the child node based at least in part on the set of resources being configured as unavailable for the parent node. For example, a CU (e.g., a base station 110 configured as IAB donor 405 in FIG. 4) may provide, to the parent node, a configuration indicating that the set of resources is unavailable for the parent node to use for communicating with child nodes of the parent node. In some aspects, a set of resources that is not available may be a set of resources that is configured (e.g., semi-statically configured) as not-available (NA) to a DU of the parent node, and/or may be a set of soft resources that are not made available to a DU. In some aspects, the set of resources may at least partially overlap with a set of soft resources allocated to the child node. That is, in some aspects, the set of resources that is unavailable for the parent node for communication with the child node may at least partially overlap with a set of soft resources allocated to the child node (e.g., by the CU).

As shown by reference 510 in FIG. 5, the parent node may provide an availability indicator to the child node based at least in part on determining that the set of resources is not available for the parent node for communication with the child node. In some aspects, as shown in FIG. 5, the availability indicator may indicate the set of resources as available for the child node.

In some aspects, the set of resources may include an entire slot, and the availability indicator may be a particular value indicating that an entirety of the slot is available for the child node. For example, the availability indicator may be a particular value that indicates to the child node that all downlink, uplink, and flexible symbols in the slot are available for the child node in the slot.

In some aspects, the set of resources may include at least a portion of a slot, and the availability indicator may be a particular value indicating that a particular set of symbols, included in the at least a portion of the slot, is available for the child node. For example, when the entire slot is not available for the parent node, the parent node may determine a configuration of soft symbols in the slot for the child node. Here, the parent node may select a particular value based at least in part on the child node's configuration of soft symbols. As a particular example, when the child node's soft symbol configuration only has soft downlink symbols, the parent node may select a value for the availability indicator, from a group of possible values, that indicates that soft downlink symbols are available for the child node. As another example, when a portion of the slot is not available for the parent node, the parent node may determine a configuration of soft symbols in the slot for the child node. Here, the parent node may select a particular value based at least in part on the child node's configuration of soft symbols. As a particular example, when the child node's soft symbol configuration indicates that the portion of the slot includes only soft uplink symbols, the parent node may select a value for the availability indicator, from a group of possible values, that indicates that soft uplink symbols are available for the child node.

In some aspects, the parent node may provide the availability indicator based at least in part on a determination that the parent node is to provide the availability indicator. For example, the parent node may receive (e.g., from the CU) a configuration indicating that the parent node is to adopt the behavior of signaling resources that are not available for the parent node as available for the child node, and may provide the availability indicator based at least in part on the configuration.

In some aspects, the parent node may provide the availability indicator based at least in part on a determination that a signaling granularity of the availability indicator supports indication of the set of resources as available for the child node. For example, the parent node may determine whether a signaling granularity of possible availability indicators is sufficient to support signaling of the set of resources as available to the child node, and may provide the availability indicator only when the signaling granularity is sufficient.

In some aspects, the parent node may determine the availability indicator based at least in part on an availability indicator configuration. In some aspects, the parent node may receive the availability indicator configuration from the CU. In some aspects, the availability indicator configuration may include a group of possible values for an availability indicator, where each value corresponds to an indication of availability or non-indication of availability for each of a group of symbol types (e.g., downlink, uplink, or flexible). In some aspects, the availability indicator configuration may include information that identifies a set of availability combinations for indicating resource availability to the child node. Here, each availability combination of the set of availability combinations may be a value that is mapped to a sequence of availability indicator values. In this way, availability indicators for multiple sets of resources (e.g., multiple slots) can be signaled simultaneously, thereby reducing signaling overhead. In some aspects, the parent node may receive the availability indicator configuration via, for example, radio resource control signaling (RRC), F1-AP signaling, or the like.

As indicated by reference 510, the child node may receive the availability indicator from the parent node. In some aspects, the availability indicator may be transmitted by the parent node and received by the child node in a search space, configured on the child node (e.g., by the CU), associated with receiving availability indicators.

As shown by reference 515, the child node may determine, based at least in part on the availability indicator, that the set of resources will not be used by the parent node for communication with the child node. For example, because the availability indicator indicates that the set of resources is available for the child node, the child node may determine that the set of resources will not be used by the parent node for communication with the child node. In some aspects, the set of resources may not be available for the parent node, as described above. Alternatively, in some aspects, the set of resources may be available for the parent node, but not being used by the parent node, a particular example of which is described below.

As shown by reference 520, in some aspects, the child node may selectively modify a scheduled communication with the parent node using the set of resources based at least in part on determining that the set of resources will not be used by the parent node for communication with the child node. In some aspects, the selective modification of the scheduled communication may include cancelling a transmission of a communication to the parent node that is scheduled (e.g., semi-statically scheduled) in the set of resources, an example of which is illustrated in FIG. 5. In some aspects, the selective modification of the scheduled communication may include cancelling an attempted reception of a communication from the parent node that is scheduled (e.g., semi-statically scheduled) in the set of resources. In some aspects, the selective modification of the scheduled communication may include modifying a configuration associated with the scheduled communication, such as modifying a transmit power used for transmitting a scheduled communication, modifying or changing a transmit beam used for transmitting a scheduled communication, modifying or changing a receive beam used for receiving a scheduled communication, modifying a data rate associated with a scheduled communication, modifying a hybrid automatic repeat request (HARQ) retransmission configuration, and/or the like. Here, the selective modification of the scheduled communication may serve to reduce interference, prevent wasted power consumption, improve resource utilization efficiency, and/or provide one or more other benefits (depending on the particular scenario).

In some aspects, since the child node will not be communicating with the parent node in the set of resources, the child node may use the resources for communication with a child node of the child node. For example, the child node may transmit a communication to the child node of the child node in the set of resources. As another example, the child node may receive a communication from the child node of the child node in the set of resources. Here, the use of the set of resources for the communication with the child node of the child node may improve resource utilization efficiency (e.g., since the set of resources may otherwise have been unused).

In some aspects, the techniques described herein may be used in support of multi-parent operation. For example, the child node may have a first parent node and a second parent node, and communications with the first and second parent nodes may use a same frequency band and/or a same frequency (e.g., when the communications are time-division multiplexed). In such a case, a particular set of resources (e.g., a particular slot) may be unavailable to the first parent node for communication with the child node but may be available to the second parent node for communication with the child node. However, as described above, the child node may not have information regarding resource configurations of the first and second parent nodes. In this example, the child node may receive availability indicators for the same set of resources from both the first and second parent nodes. Using the technique described above, the first parent node would indicate the set of resources as available to the child node (e.g., since the set of resources is not available for the first parent node for communication with the child node). Thus, the child node may determine the availability of the set of resources as indicated by the second parent node.

In some aspects, the techniques described herein may be used in a scenario in which a parent node determines that a set of resources that could be used for communication with a child node of the parent node will not actually be used for communication with the child node (e.g., when the set of resources is not available, when the set of resources is available but the parent node decides to cancel communication with the child node in the set of resources, and/or the like). In such a case, the parent node may provide a particular availability indicator value that indicates that a type of soft resource (e.g., downlink symbols, uplink symbols, or flexible symbols) is available for the child node, while the child is not allocated that type of soft resource. In such a case, the child node may be configured to interpret the availability indicator as an indication that no communication with the parent node will occur within resources of the type indicated by the availability indicator. For example, the child node may only have hard downlink resources (or NA downlink resources) configured, and may receive an availability indicator indicating that a soft downlink resource is available. Here, because the child node is not configured with any soft downlink resources, the child node would interpret the availability indicator to mean that no communication with the parent node will occur within the hard downlink symbols (or not available downlink symbols), meaning that the child node could use the hard downlink symbols for another operation (e.g., communicating with a child node of the child node).

In some aspects, as described above, the parent node may select and provide the availability indicator based at least in part on an availability indicator configuration provided by the CU. In some aspects, the CU may also provide the availability indicator configuration to the child node (e.g., in order to allow the child node to interpret availability indicator values received from the parent node).

In some aspects, the CU may determine the availability indicator configuration based at least in part on a resource configuration associated with the parent node. For example, the CU may determine that a set of resources is not available to the parent node for communication with the child node. Next, the CU may select an availability indicator configuration based at least in part on determining that the set of resources is not available to the parent node for communication with the child node. For example, the CU may select the availability indicator configuration in order to permit the parent node to indicate, to the child node, the set of resources as available for the child node. That is, the CU may identify an availability indicator configuration that enables the parent node to signal to the child node that the set of resources is available for the child node. In some aspects, the CU may provide the availability indicator configuration to the parent node and/or the child node. In some aspects, the CU may provide the availability indicator configuration via RRC signaling, F1-AP signaling, and/or the like.

In some aspects, as described above, the set of resources may at least partially overlap with a set of soft resources allocated to the child node. In some aspects, the set of resources may include an entire slot, and the availability indicator configuration selected by the CU may include an availability indicator that is a particular value indicating that an entirety of the slot is available for the child node. In some aspects, the set of resources may include at least a portion of a slot, and the availability indicator configuration selected by the CU may include an availability indicator that is a particular value indicating that a particular set of symbols (e.g., a set of downlink symbols, a set of uplink symbols, or a set of flexible symbols) included in the at least a portion of the slot, is available for the child node. In some aspects, as described above, the availability indicator configuration may include information that identifies a set of availability combinations for indicating resource availability to the child node.

As indicated above, FIG. 5 is provided as an example. Other examples may differ from what is described with respect to FIG. 5.

Figure 6:
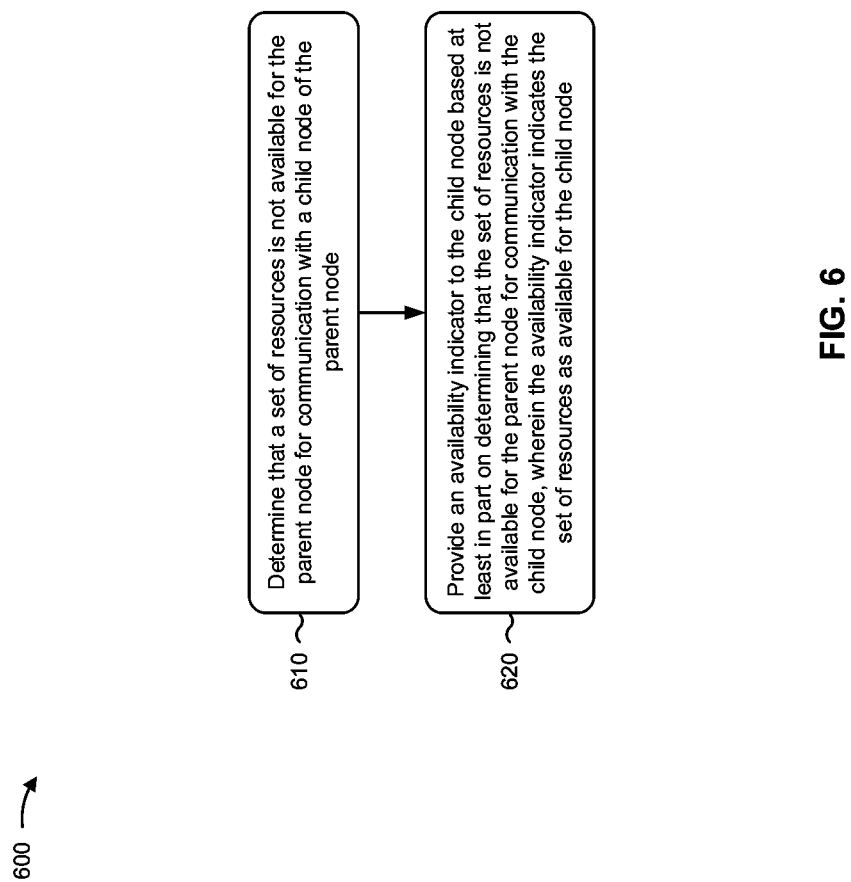
FIG. 6 is a diagram illustrating an example process performed, for example, by a parent node in an IAB network, in accordance with various aspects of the present disclosure.

FIG. 6 is a diagram illustrating an example process 600 performed, for example, by a parent node in an IAB network, in accordance with various aspects of the present disclosure. Example process 600 is an example where the parent node (e.g., base station 110 configured as a parent node in an IAB network, a non-anchor base station 345 shown in FIG. 3, an IAB node 410 shown in FIG. 4, the parent node illustrated in FIG. 5, and/or the like) performs operations associated with management of resources in IAB.

As shown in FIG. 6, in some aspects, process 600 may include determining that a set of resources is not available for the parent node for communication with a child node of the parent node (block 610). For example, the parent node (e.g., using transmit processor 220, receive processor 238, controller/processor 240, memory 242, determination component 908, and/or the like) may determine that a set of resources is not available for the parent node for communication with a child node of the parent node (e.g., a base station 110 or a UE 120 configured as a child node in an IAB network), as described above.

As further shown in FIG. 6, in some aspects, process 600 may include providing an availability indicator to the child node based at least in part on determining that the set of resources is not available for the parent node for communication with the child node (block 620). For example, the base station (e.g., using transmit processor 220, receive processor 238, controller/processor 240, memory 242, transmission component 904, and/or the like) may provide an availability indicator to the child node based at least in part on determining that the set of resources is not available for the parent node for communication with the child node, as described above. In some aspects, the availability indicator indicates the set of resources as available for the child node.

Process 600 may include additional aspects, such as any single aspect or any combination of aspects described below and/or in connection with one or more other processes described elsewhere herein.

In a first aspect, the set of resources is configured as unavailable for the parent node. In a second aspect, alone or in combination with the first aspect, the set of resources at least partially overlaps with a set of soft resources allocated to the child node. In a third aspect, alone or in combination with one or more of the first and second aspects, the set of resources comprises an entire slot, and the availability indicator is a particular value indicating that an entirety of the slot is available for the child node. In a fourth aspect, alone or in combination with one or more of the first through third aspects, the set of resources comprises at least a portion of a slot, and the availability indicator is a particular value indicating that a particular set of symbols, included in the at least a portion of the slot, is available for the child node, wherein the particular set of symbols includes a set of downlink symbols, a set of uplink symbols, or a set of flexible symbols. In a fifth aspect, alone or in combination with one or more of the first through fourth aspects, the particular value is determined based at least in part on a configuration of soft symbol resources of the child node.

In a sixth aspect, alone or in combination with one or more of the first through fifth aspects, process 600 includes receiving an availability indicator configuration from a CU (e.g., a base station 110 configured as a CU in an IAB network), wherein the availability indicator configuration includes information that identifies a set of availability combinations for indicating resource availability to the child node; and determining the availability indicator based at least in part on the availability indicator configuration.

In a seventh aspect, alone or in combination with one or more of the first through sixth aspects, the availability indicator configuration is received via at least one of a radio resource control signaling, or an F1-AP signaling.

In an eighth aspect, alone or in combination with one or more of the first through seventh aspects, the availability indicator is provided based at least in part on a determination that the parent node is to provide the availability indicator. In a ninth aspect, alone or in combination with one or more of the first through eighth aspects, the availability indicator is provided based at least in part on a determination that a signaling granularity of the availability indicator supports indication of the set of resources as available for the child node.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
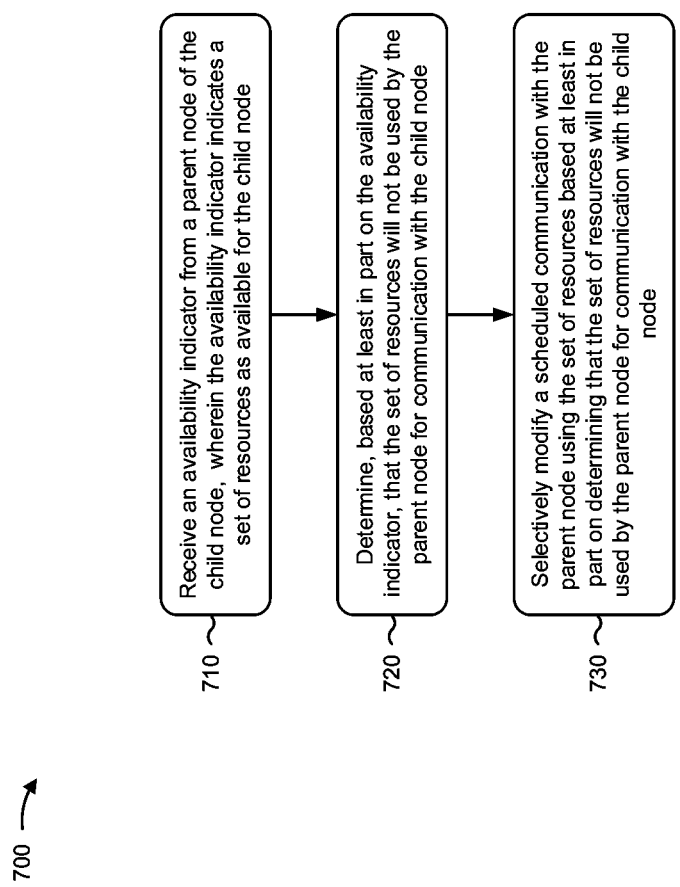
FIG. 7 is a diagram illustrating an example process performed, for example, by a child node in an IAB network, in accordance with various aspects of the present disclosure.

FIG. 7 is a diagram illustrating an example process 700 performed, for example, by a child node in an IAB network, in accordance with various aspects of the present disclosure. Example process 700 is an example where the child node (e.g., a base station 110 configured as a child node in an IAB network, a UE 120 configured as a child node in an IAB network, a non-anchor base station 345 shown in FIG. 3, a UE 355 shown in FIG. 3, an IAB node 410 shown in FIG. 4, a UE 120 shown in FIG. 4, the child node illustrated in FIG. 5, and/or the like) performs operations associated with management of resources in IAB.

As shown in FIG. 7, in some aspects, process 700 may include receiving an availability indicator from a parent node of the child node (block 710). For example, the child node (e.g., using transmit processor 220, receive processor 238, controller/processor 240, memory 242, and/or the like when the child node is a base station 110, using receive processor 258, transmit processor 264, controller/processor 280, memory 282, and/or the like when the child node is a UE 120, using reception component 1002) may receive an availability indicator from a parent node of the child node (e.g., a base station 110 configured as a parent node in an IAB network), as described above. In some aspects, the availability indicator indicates a set of resources as available for the child node.

As further shown in FIG. 7, in some aspects, process 700 may include determining, based at least in part on the availability indicator, that the set of resources will not be used by the parent node for communication with the child node (block 720). For example, the child node (e.g., using transmit processor 220, receive processor 238, controller/processor 240, memory 242, and/or the like when the child node is a base station 110, using receive processor 258, transmit processor 264, controller/processor 280, memory 282, and/or the like when the child node is a UE 120, using determination component 1008) may determine, based at least in part on the availability indicator, that the set of resources will not be used by the parent node for communication with the child node, as described above.

As further shown in FIG. 7, in some aspects, process 700 may include selectively modifying a scheduled communication with the parent node using the set of resources based at least in part on determining that the set of resources will not be used by the parent node for communication with the child node (block 730). For example, the child node (e.g., using transmit processor 220, receive processor 238, controller/processor 240, memory 242, and/or the like when the child node is a base station 110, using receive processor 258, transmit processor 264, controller/processor 280, memory 282, and/or the like when the child node is a UE 120, using modification component 1010) may selectively modify a scheduled communication with the parent node using the set of resources based at least in part on determining that the set of resources will not be used by the parent node for communication with the child node, as described above.

Process 700 may include additional aspects, such as any single aspect or any combination of aspects described below and/or in connection with one or more other processes described elsewhere herein.

In a first aspect, selectively modifying the scheduled communication comprises cancelling a transmission of a communication to the parent node that is scheduled in the set of resources. In a second aspect, alone or in combination with the first aspect, selectively modifying the scheduled communication comprises cancelling an attempted reception of a communication from the parent node that is scheduled in the set of resources. In a third aspect, alone or in combination with one or more of the first and second aspects, selectively modifying the scheduled communication comprises modifying a configuration associated with the scheduled communication.

In a fourth aspect, alone or in combination with one or more of the first through third aspects, the configuration includes at least one of a transmit power, a transmit beam, a receive beam, a data rate, or a HARQ retransmission configuration.

In a fifth aspect, alone or in combination with one or more of the first through fourth aspects, the set of resources is configured as unavailable for the parent node.

In a sixth aspect, alone or in combination with one or more of the first through fifth aspects, the set of resources is available for the parent node and is not being used by the parent node.

In a seventh aspect, alone or in combination with one or more of the first through sixth aspects, the set of resources at least partially overlaps with a set of soft resources allocated to the child node.

In an eighth aspect, alone or in combination with one or more of the first through seventh aspects, the set of resources comprises a slot, and the availability indicator is a particular value indicating that an entirety of the slot is available for the child node.

In a ninth aspect, alone or in combination with one or more of the first through eighth aspects, the set of resources comprises at least a portion of a slot, and the availability indicator is a particular value indicating that a particular set of symbols, included in the at least a portion of the slot, is available for the child node, wherein the particular set of symbols includes a set of downlink symbols, a set of uplink symbols, or a set of flexible symbols.

In a tenth aspect, alone or in combination with one or more of the first through ninth aspects, process 700 includes transmitting a communication to a child node of the child node in the set of resources. In an eleventh aspect, alone or in combination with one or more of the first through tenth aspects, process 700 includes receiving a communication from a child node of the child node in the set of resources.

In a twelfth aspect, alone or in combination with one or more of the first through eleventh aspects, the availability indicator is received in a search space, configured on the child node, associated with receiving availability indicators.

In a thirteenth aspect, alone or in combination with one or more of the first through twelfth aspects, process 700 includes receiving another availability indicator associated with the set of resources from another parent node of the child node; and determining availability of the set of resources based at least in part on the other availability indicator, wherein the availability of the set of resources is determined based at least in part on the other availability indicator, due to the availability indicator indicating the set of resources as available for the child node.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
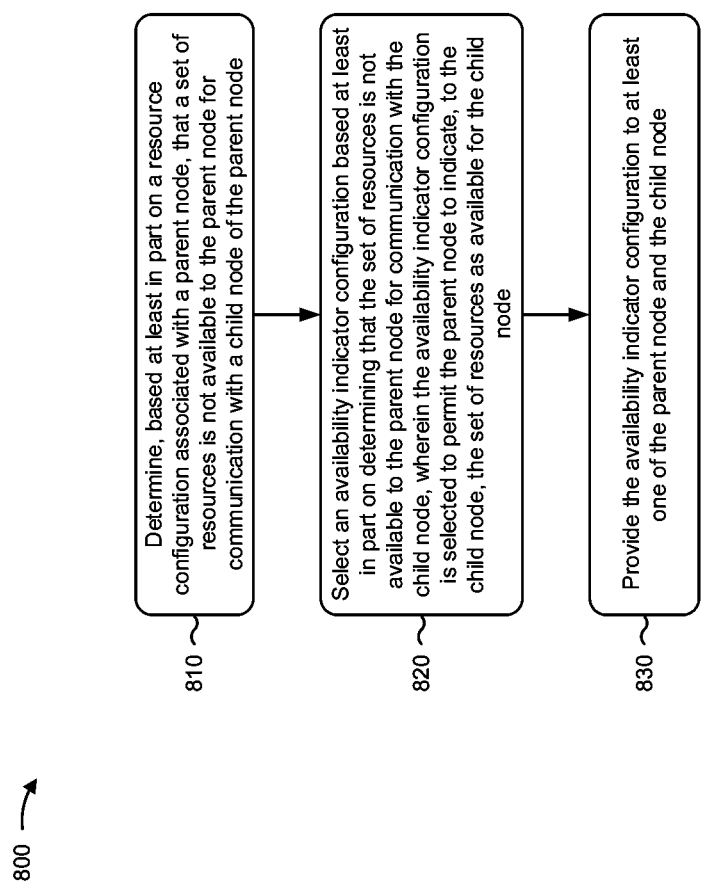
FIG. 8 is a diagram illustrating an example process performed, for example, by a central unit in an IAB network, in accordance with various aspects of the present disclosure.

FIG. 8 is a diagram illustrating an example process 800 performed, for example, by a CU in an IAB network, in accordance with various aspects of the present disclosure. Example process 800 is an example where the CU base station (e.g., a base station 110 configured as a CU in an IAB network, an anchor base station 335 shown in FIG. 3, an IAB donor 405 shown in FIG. 4, and/or the like) performs operations associated with management of resources in IAB.

As shown in FIG. 8, in some aspects, process 800 may include determining, based at least in part on a resource configuration associated with a parent node, that a set of resources is not available to the parent node for communication with a child node of the parent node (block 810). For example, the CU (e.g., using transmit processor 220, receive processor 238, controller/processor 240, memory 242, determination component 1108, and/or the like) may determine, based at least in part on a resource configuration associated with a parent node (e.g., a base station 110 configured as a parent node in the IAB network), that a set of resources is not available to the parent node for communication with a child node of the parent node (e.g., a base station 110 configured as a child node in the IAB network, a UE 120 configured as a child node in the IAB network), as described above.

As further shown in FIG. 8, in some aspects, process 800 may include selecting an availability indicator configuration based at least in part on determining that the set of resources is not available to the parent node for communication with the child node (block 820). For example, the CU (e.g., using transmit processor 220, receive processor 238, controller/processor 240, memory 242, selection component 1110, and/or the like) may select an availability indicator configuration based at least in part on determining that the set of resources is not available to the parent node for communication with the child node, as described above. In some aspects, the availability indicator configuration is selected to permit the parent node to indicate, to the child node, the set of resources as available for the child node.

As further shown in FIG. 8, in some aspects, process 800 may include providing the availability indicator configuration to at least one of the parent node or the child node (block 830). For example, the CU (e.g., using transmit processor 220, receive processor 238, controller/processor 240, memory 242, transmission component 1104, and/or the like) may provide the availability indicator configuration to at least one of the parent node or the child node, as described above.

Process 800 may include additional aspects, such as any single aspect or any combination of aspects described below and/or in connection with one or more other processes described elsewhere herein.

In a first aspect, the set of resources at least partially overlaps with a set of soft resources allocated to the child node. In a second aspect, alone or in combination with the first aspect, the set of resources comprises an entire slot, and the availability indicator configuration includes an availability indicator that is a particular value indicating that an entirety of the slot is available for the child node. In a third aspect, alone or in combination with one or more of the first and second aspects, the set of resources comprises at least a portion of a slot, and the availability indicator configuration includes an availability indicator that is a particular value indicating that a particular set of symbols, included in the at least a portion of the slot, is available for the child node.

In a fourth aspect, alone or in combination with one or more of the first through third aspects, the availability indicator configuration is provided via at least one of a radio resource control signaling, or an F1-AP signaling.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
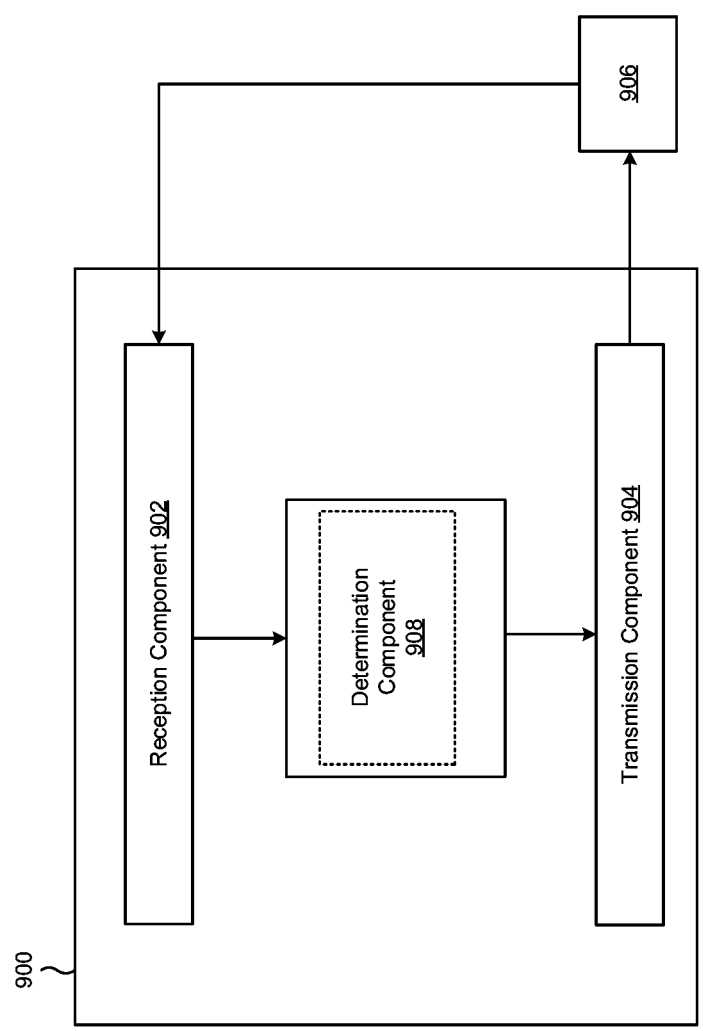
FIGS. 9-11 are block diagrams of example apparatuses for wireless communication, in accordance with various aspects of the present disclosure.

FIG. 9 is a block diagram of an example apparatus 900 for wireless communication. The apparatus 900 may be a parent node, or a parent node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908, among other examples.

In some aspects, the apparatus 900 may be configured to perform one or more operations described herein in connection with FIG. 5. Additionally or alternatively, the apparatus 900 may be configured to perform one or more processes described herein, such as process 600 of FIG. 6. In some aspects, the apparatus 900 and/or one or more components shown in FIG. 9 may include one or more components of the base station described above in connection with FIG. 2, a non-anchor base station described above in connection with FIG. 3, and/or an IAB node described above in connection with FIG. 4. Additionally, or alternatively, one or more components shown in FIG. 9 may be implemented within one or more components described above in connection with FIGS. 2-4. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the parent node described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the parent node described above in connection with FIG. 2. In some aspects, the transmission component 904 may be collocated with the reception component 902 in a transceiver.

The determination component 908 may determine that a set of resources is not available for the parent node for communication with a child node of the parent node. In some aspects, the determination component 908 may include one or more antennas, a demodulator, a MIMO detector, a receive processor, a modulator, a transmit MIMO processor, a transmit processor, a controller/processor, a memory, or a combination thereof, of the base station described above in connection with FIG. 2. The transmission component 904 may provide an availability indicator to the child node based at least in part on determining that the set of resources is not available for the parent node for communication with the child node.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
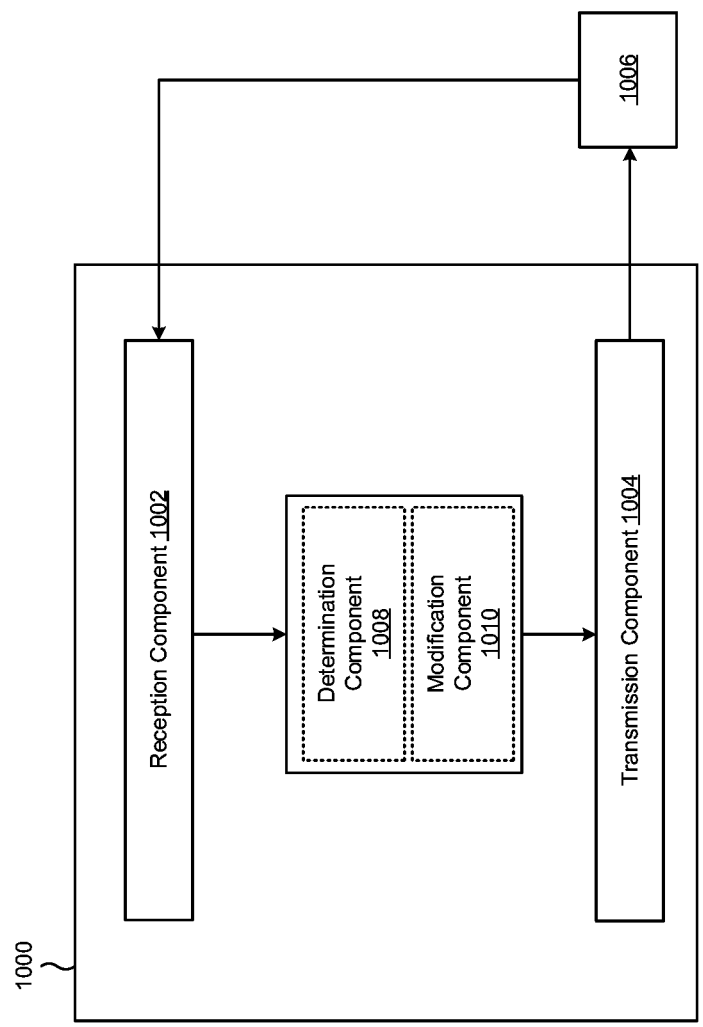

FIG. 10 is a block diagram of an example apparatus 1000 for wireless communication. The apparatus 1000 may be a child node, or a child node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a determination component 1008 or a modification component 1010, among other examples.

In some aspects, the apparatus 1000 may be configured to perform one or more operations described herein in connection with FIG. 5. Additionally or alternatively, the apparatus 1000 may be configured to perform one or more processes described herein, such as process 700 of FIG. 7. In some aspects, the apparatus 1000 and/or one or more components shown in FIG. 10 may include one or more components of the base station described above in connection with FIG. 2, the UE described above in connection with FIG. 2, a non-anchor base station 345 described above in connection FIG. 3, a UE described above in connection FIG. 3, an IAB node 410 described above in connection FIG. 4, and/or a UE described above in connection FIG. 4. Additionally, or alternatively, one or more components shown in FIG. 10 may be implemented within one or more components described above in connection with FIGS. 2-4. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2, or one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2, or one or more antennas, a demodulator, a MIMO detector, a receive processor, a controller/processor, a memory, or a combination thereof, of the UE described above in connection with FIG. 2. In some aspects, the transmission component 1004 may be collocated with the reception component 1002 in a transceiver.

The reception component 1002 may receive an availability indicator from a parent node of the child node. The determination component 1008 may determine, based at least in part on the availability indicator, that the set of resources will not be used by the parent node for communication with the child node. In some aspects, the determination component 1008 may include one or more antennas, a demodulator, a MIMO detector, a receive processor, a modulator, a transmit MIMO processor, a transmit processor, a controller/processor, a memory, or a combination thereof, described above in connection with FIG. 2. The modification component 1010 may selectively modify a scheduled communication with the parent node using the set of resources based at least in part on determining that the set of resources will not be used by the parent node for communication with the child node. In some aspects, the modification component 1010 may include one or more antennas, a demodulator, a MIMO detector, a receive processor, a modulator, a transmit MIMO processor, a transmit processor, a controller/processor, a memory, or a combination thereof, described above in connection with FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
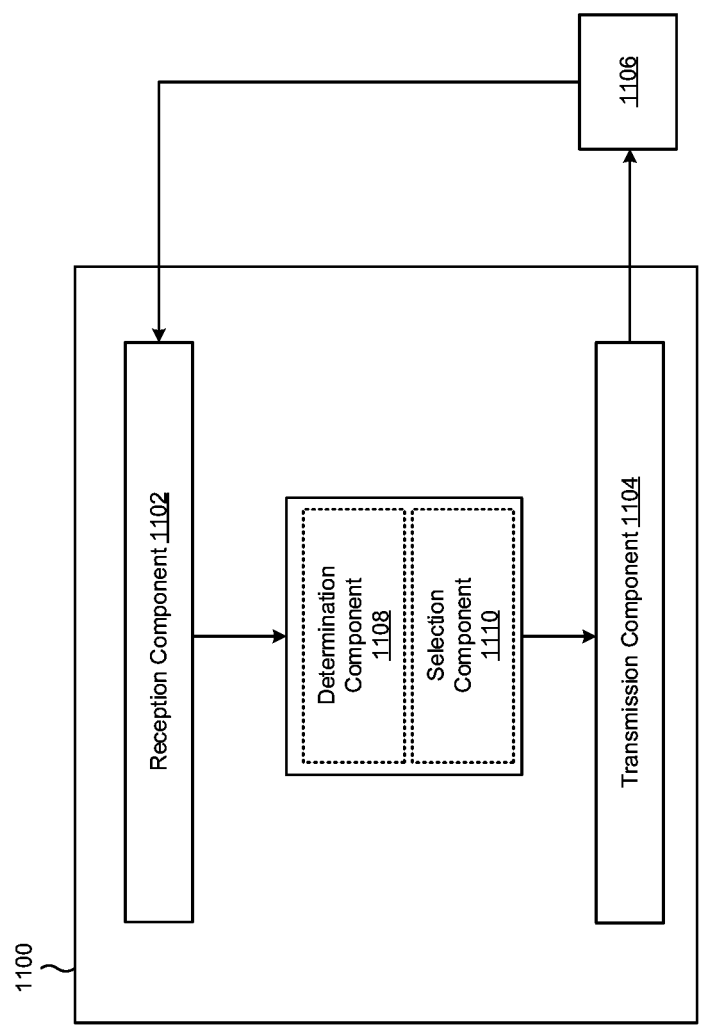

FIG. 11 is a block diagram of an example apparatus 1100 for wireless communication. The apparatus 1100 may be a CU, or a CU may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a determination component 1108, or a selection component 1110, among other examples.

In some aspects, the apparatus 1100 may be configured to perform one or more operations described herein in connection with FIG. 5. Additionally or alternatively, the apparatus 1100 may be configured to perform one or more processes described herein, such as process 800 of FIG. 8. In some aspects, the apparatus 1100 and/or one or more components shown in FIG. 11 may include one or more components of the base station described above in connection with FIG. 2, an anchor base station described above in connection with FIG. 3, and/or an IAB donor described above in connection with FIG. 4. Additionally, or alternatively, one or more components shown in FIG. 11 may be implemented within one or more components described above in connection with FIGS. 2-4. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be collocated with the reception component 1102 in a transceiver.

The determination component 1108 may determine, based at least in part on a resource configuration associated with a parent node, that a set of resources is not available to the parent node for communication with a child node of the parent node. In some aspects, the determination component 1108 may include one or more antennas, a demodulator, a MIMO detector, a receive processor, a modulator, a transmit MIMO processor, a transmit processor, a controller/processor, a memory, or a combination thereof, of the base station described above in connection with FIG. 2. The selection component 1110 may select an availability indicator configuration based at least in part on determining that the set of resources is not available to the parent node for communication with the child node. In some aspects, the selection component 1110 may include one or more antennas, a demodulator, a MIMO detector, a receive processor, a modulator, a transmit MIMO processor, a transmit processor, a controller/processor, a memory, or a combination thereof, of the base station described above in connection with FIG. 2. The transmission component 1104 may provide the availability indicator configuration to at least one of the parent node or the child node.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a parent node, comprising:
  receiving a configuration indicating that a set of resources is not available for the parent node for communication with a child node of the parent node; and
  providing an availability indicator to the child node based at least in part on receiving the configuration that the set of resources is not available for the parent node for communication with the child node,
    wherein the availability indicator indicates the set of resources as available for the child node, and wherein the set of resources comprises at least a portion of a slot, and the availability indicator is a value indicating that a set of symbols, included in the at least the portion of the slot, is available for the child node.

2. The method of claim 1, wherein the set of resources is configured as unavailable for the parent node.

3. The method of claim 1, wherein the set of resources at least partially overlaps with a set of soft resources allocated to the child node.

4. The method of claim 1, wherein the set of resources comprises an entire slot, and the value indicates that the entire slot is available for the child node.

5. The method of claim 1,
wherein the set of symbols includes a set of downlink symbols, a set of uplink symbols, or a set of flexible symbols.

6. The method of claim 5, wherein the value is determined based at least in part on a configuration of soft symbol resources of the child node.

7. The method of claim 1, further comprising:
receiving an availability indicator configuration from a central unit,
wherein the availability indicator configuration includes information that identifies a set of availability combinations for indicating resource availability to the child node; and
determining the availability indicator based at least in part on the availability indicator configuration.

8. The method of claim 7, wherein the availability indicator configuration is received via at least one of a radio resource control signaling, or an FI-AP signaling.

9. The method of claim 1, wherein the availability indicator is provided based at least in part on a determination that the parent node is to provide the availability indicator.

10. The method of claim 1, wherein the availability indicator is provided based at least in part on a determination that a signaling granularity of the availability indicator supports indication of the set of resources as available for the child node.

11. A method of wireless communication performed by a child node, comprising:
receiving an availability indicator from a parent node of the child node,
wherein the availability indicator indicates a set of resources as available for the child node, and
wherein the set of resources comprises at least a portion of a slot, and the availability indicator is a value indicating that a set of symbols, included in the at least the portion of the slot, is available for the child node;
determining, based at least in part on the availability indicator, that the set of resources will not be used by the parent node for communication with the child node; and
selectively modifying a scheduled communication with the parent node using the set of resources based at least in part on determining that the set of resources will not be used by the parent node for communication with the child node.

12. The method of claim 11, wherein selectively modifying the scheduled communication comprises cancelling a transmission of a communication to the parent node that is scheduled in the set of resources.

13. The method of claim 11, wherein selectively modifying the scheduled communication comprises cancelling an attempted reception of a communication from the parent node that is scheduled in the set of resources.

14. The method of claim 11, wherein selectively modifying the scheduled communication comprises modifying a configuration associated with the scheduled communication.

15. The method of claim 14, wherein the configuration includes at least one of:
a transmit power,
a transmit beam,
a receive beam,
a data rate, or
a hybrid automatic repeat request retransmission configuration.

16. The method of claim 11, wherein the set of resources is configured as unavailable for the parent node.

17. The method of claim 11, wherein the set of resources is available for the parent node and is not being used by the parent node.

18. The method of claim 11, wherein the set of resources at least partially overlaps with a set of soft resources allocated to the child node.

19. The method of claim 11, wherein the set of resources comprises an entire slot, and the value indicates that the entire slot is available for the child node.

20. The method of claim 11,
wherein the set of symbols includes a set of downlink symbols, a set of uplink symbols, or a set of flexible symbols.

21. The method of claim 11, further comprising transmitting a communication to a child node of the child node in the set of resources.

22. The method of claim 11, further comprising receiving a communication from a child node of the child node in the set of resources.

23. The method of claim 11, wherein the availability indicator is received in a search space, configured on the child node, associated with receiving availability indicators.

24. The method of claim 11, further comprising:
receiving another availability indicator associated with the set of resources from another parent node of the child node; and
determining availability of the set of resources based at least in part on the other availability indicator,
wherein the availability of the set of resources is determined based at least in part on the other availability indicator due to the availability indicator indicating the set of resources as available for the child node.

25. A method of wireless communication performed by a central unit (CU), comprising:
determining, based at least in part on a resource configuration associated with a parent node, that a set of resources is not available to the parent node for communication with a child node of the parent node;
selecting an availability indicator configuration based at least in part on determining that the set of resources is not available to the parent node for communication with the child node,
wherein the availability indicator configuration is selected to permit the parent node to indicate, to the child node, the set of resources as available for the child node, and
wherein the set of resources comprises at least a portion of a slot, and the availability indicator configuration includes an availability indicator that is a value indicating that a set of symbols, included in the at least the portion of the slot, is available for the child node; and providing the availability indicator configuration to at least one of the parent node or the child node.

26. The method of claim 25, wherein the set of resources at least partially overlaps with a set of soft resources allocated to the child node.

27. The method of claim 25, wherein the set of resources comprises an entire slot, and the value indicates that the entire slot is available for the child node.

28. The method of claim 25,
wherein the set of symbols includes a set of downlink symbols, a set of uplink symbols, or a set of flexible symbols.

29. The method of claim 25, wherein the availability indicator configuration is provided via at least one of a radio resource control signaling, or an FI-AP signaling.

30. A child node for wireless communication, comprising:
a memory; and
one or more processors coupled to the memory, the one or more processors configured to:
receive an availability indicator from a parent node of the child node,
wherein the availability indicator indicates a set of resources as available for the child node, and
wherein the set of resources comprises at least a portion of a slot, and the availability indicator is a value indicating that a set of symbols, included in the at least the portion of the slot, is available for the child node;
determine, based at least in part on the availability indicator, that the set of resources will not be used by the parent node for communication with the child node; and
selectively modify a scheduled communication with the parent node using the set of resources based at least in part on determining that the set of resources will not be used by the parent node for communication with the child node.

* * * * *